United States Patent [19]
Jeong et al.

[11] Patent Number: 5,666,816
[45] Date of Patent: Sep. 16, 1997

[54] DEFROSTING METHOD AND APPARATUS FOR REFRIGERATOR USING GA-FUZZY THEORY

[75] Inventors: Seong-wook Jeong, Suwon; Jae-in Kim, Seoul; Yun-seok Kang, Suwon, all of Rep. of Korea

[73] Assignee: Samsung Electronics Co., Ltd., Suwon, Rep. of Korea

[21] Appl. No.: 531,086

[22] Filed: Sep. 20, 1995

[30] Foreign Application Priority Data

Nov. 30, 1994 [KR] Rep. of Korea ............... 94-32118

[51] Int. Cl.⁶ ............................................. F25D 21/06
[52] U.S. Cl. .................................. 62/154; 62/156
[58] Field of Search ........................ 62/80, 155, 154, 62/156, 176.2, 234, 152

[56] References Cited

U.S. PATENT DOCUMENTS

| | | | |
|---|---|---|---|
| 3,460,352 | 8/1969 | Lorenz | 62/153 |
| 3,759,049 | 9/1973 | Bell et al. | 62/176.2 X |
| 3,839,878 | 10/1974 | Tilmanis | 62/156 X |
| 4,129,993 | 12/1978 | Schotten | 62/156 |
| 5,379,608 | 1/1995 | Ishimaru et al. | 62/155 |
| 5,493,867 | 2/1996 | Szynal et al. | 62/155 X |

*Primary Examiner*—Harry B. Tanner
*Attorney, Agent, or Firm*—Burns, Doane, Swecker & Mathis LLP

[57] ABSTRACT

There are described a defrosting method and apparatus of a refrigerator using a GA-fuzzy theory. The defrosting method comprises the steps of: inputting reference learning data by experiment and actual data to a microcomputer; inferring frost-quantity on an evaporator from the input data by using the GA-fuzzy theory; calculating a defrosting period from the frost amount; and controlling a defrosting heater depending on said defrosting period. According to the present invention, a refrigerator can be defrosted by calculating the frost-quantity on the evaporator with precision and accuracy even at an input function which has many inflexion points and is impossible to differentiate, which is different from the conventional defrosting method using the crisp's logical algorithm consisting of '0' and '1'.

6 Claims, 7 Drawing Sheets

$$A1' = 0.5 + (|x-p1| - |x-p2|) / 2(p1-p2)$$

$$A2' = 0.5 + (|x-p3| - |x-p4|) / 2(p3-p4)$$

DEFROSTING METHOD AND APPARATUS FOR REFRIGERATOR USING GA-FUZZY THEORY

BACKGROUND OF THE INVENTION

The present invention relates to a defrosting method and apparatus for a refrigerator, more particularly, to a defrosting method and apparatus for a refrigerator using a genetic algorithm (hereinafter, referred to as GA)-fuzzy theory.

The term, GA-fuzzy theory is a compound word of GA and the fuzzy theory. GA is an algorithm for continuously inferring an unknown correlative function suitable for a type of input data, to which a procedure of reproduction, hybridization or mutant in an ecosystem is applied. The fuzzy theory is for overcoming limitations of the crisp's logic consisting of '0' and '1', and has been developed itself with variety. The pivot of the fuzzy theory is an inference method using a conditional function. The fuzzy inference method based on the modus ponens theory of Zadeh, a mathematician and founder of the fuzzy theory, infers an output for an input from the outside. Currently, there are widely used three kinds of fuzzy inference methods, that is, a direct inference method, an indirect inference method and a mixed inference method. Each inference method has an operation method for effecting an inference procedure of each inference method efficiently.

The direct inference method includes a max-min operation method and a max-dot operation method. The indirect inference method uses an operation method that a function belonging to a conclusion of each rule is included in an inferrer as a type of a monotonically increasing function. The mixed inference method uses an operation method that an objective function of the set rules are simplified to a linear equation or a constant value, thereby directly inferring by a numerical calculation method.

FIG. 1 is a perspective view roughly showing a structure of a common refrigerator. The right side of FIG. 1 represents the rear portion of the refrigerator. As shown in FIG. 1, there is provided a freezing room 2 and a cold-storage room 3 for storing food to the upper and the lower parts inside a body 1. Doors 2a and 3a are mounted to the front surface of body 1 for opening and shutting freezing room 2 and cold-storage room 3. An evaporator 4 is mounted to the lower end portion of freezing room 2 for heat-exchanging supplied air to cold air by the latent evaporation heat of the refrigerant. A fan 5 and a fan motor 5a are mounted to the right of evaporator 4 for circulating the cold air heat-exchanged by evaporator 4 to freezing room 2 and cold-storage room 3. A thermostatic damper 6 is mounted at the right side of the upper end portion of cold-storage room 3 for controlling amount of cold air provided into cold-storage room 3 by sensing a temperature of the inside of cold-storage room 3. Plural shelf members 7, which divide inner space, are mounted inside freezing room 2 and cold-storage room 3 for supporting food. Duct members 8 and 9 are mounted in the rear of freezing room 2 and cold-storage room 3 for controlling the flowing direction of the cold air so as to circulate the cold air heat-exchanged by evaporator 4 into freezing room 2 and cold-storage room 3. Also, cold air guiding paths 8a and 9a are formed beside the rear wall of freezing room 2 and cold-storage room 3 for guiding the cold air into freezing room 2 and cold-storage room 3. A compressor 10 is mounted to the rear lower end portion of body 1 for compressing a low-temperature and low-pressure gaseous refrigerant cooled in evaporator 4 into a high-temperature and high-pressure gaseous state. An evaporation dish 11 is mounted to the left side of compressor 10 for collecting the defrosting water (moisture in the air generated when the air supplied by driving fan 5a is cooled by heat-exchanging in evaporator 4). An auxiliary condenser 12 is mounted to the bottom of evaporation dish 11 for evaporating the defrosting water collected in evaporation dish 11. A main condenser 13 is embedded over the whole area of backboard 1a or the sidewalls of body 1 in the shape of zigzag for converting the high-temperature and high-pressure gaseous refrigerant compressed in compressor 10 into a low-temperature and high-pressure liquid refrigerant. A capillary tubing 14 is mounted to the one side of compressor 10 for reducing the pressure of the refrigerant liquidized in main condenser 13 up to the evaporation pressure to convert the refrigerant into a frostless low-temperature and low-pressure refrigerant. An antifrosting pipe 15 for preventing frosting phenomenon caused by the contact of the warm air outside and cold air inside body 1 is mounted to the lower front portion of body 1.

In the common refrigerator constituted as described above, its operation is as follows:

When power is supplied after setting a predetermined inner temperature, the temperature sensor mounted to a predetermined site of freezing room 2 judges whether the inner temperature excesses the set temperature or not. If the inner temperature of freezing room 2 is higher than the set temperature, compressor 10 and fan motor 5 drive, and at the same time, fan 5a starts to rotate. The refrigerant compressed to high-temperature and high-pressure gaseous state by compressor 10 evaporates the defrosting water collected in evaporation dish 11 as it passes through auxiliary condenser 12, and thereafter is cooled and liquidized to a low-temperature and high-pressure liquid refrigerant as it flows into main condenser 13. The liquid refrigerant prevents the frosting phenomenon in the refrigerator as it passes through antifrosting pipe 15, and reduces to the frostless low-temperature and low-pressure refrigerant to flow into evaporator 4 as it passes through capillary tubing 14 for expanding the liquid refrigerant up to the evaporation pressure.

FIG. 2 is a diagram showing a cold air flow of a common refrigerator. As shown in FIG. 2, air supplied when the low-temperature and low-pressure refrigerant pressure-reduced through capillary tubing 14 evaporates to gas while passing through several pipes is heat-exchanged to cold air in evaporator 4. And the low-temperature and low-pressure gaseous refrigerant cooled in evaporator 4 returns to compressor 10 so as to form a repeatedly circulating freezing cycle. The cold air heat-exchanged by evaporator 4 in FIG. 2 is guided along duct members 8 and 9 by the rotation of fan 5a according to driving of fan motor 5, and then is supplied into the inside of freezing room 2 and cold-storage room 3 via cold air guiding paths 8a and 9a. The temperature of the inside of freezing room 2 and cold-storage room 3 drops less than the set temperature due to the cold air.

FIG. 3 is a flow chart showing a conventional defrosting method of a refrigerator. As shown in FIG. 3, reference data with respect to the inner temperature of the evaporator and the operation time of the compressor are input, respectively. If the operation time of the compressor exceeds the reference data and the inner temperature of the evaporator drops less than the reference data, heater operates. If the inner temperature of the evaporator exceed the reference data after operating the heater, the heater stops operating. In the conventional defrosting method of a refrigerator as described above, input variables (e.g. the inner temperature of the evaporator or the operation time of the compressor) are measured, and directly compared with the reference data, thereby operating a defrosting heater. Therefore, the conventional defrosting method for a refrigerator has limitations on precision and accuracy in the case of an input function which has a many inflexion points and is impossible to differentiate because a microcomputer is programmed by using a crisp's logical algorithm consisting of '0' and '1'.

SUMMARY OF THE INVENTION

An object of the present invention is to provide a defrosting method and apparatus for a refrigerator using GA-fuzzy theory which can overcome the above-described limitations of the prior art.

To achieve the above object, a defrosting method of a refrigerator according to the present invention comprises the steps of: inputting reference learning data by experiment and actual data to a microcomputer; inferring an amount of frost on an evaporator from the input data by using the GA-fuzzy theory; calculating a defrosting period from the frost amount on the evaporator; and controlling a defrosting heater depending on the calculated defrosting period.

Also, to achieve the above object, there is provided a defrosting apparatus of a refrigerator comprising: means for inputting reference learning data by experiment and actual data; means for inferring an amount of frost on an evaporator from the input data by using the GA-fuzzy theory; means for calculating a defrosting period from the frost amount on the evaporator; and means for controlling a defrosting heater depending on the defrosting period.

Therefore, a refrigerator can be defrosted by calculating an amount of frost on the evaporator with precision and accuracy even at an input function which has many inflexion points and is impossible to differentiate, according to the defrosting method of the present invention, which is different from the conventional defrosting method using the crisp's logical algorithm consisting of '0' and '1'.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION

With reference to the attached drawings, a preferred embodiment of the present invention will be described in detail.

Figure 1:
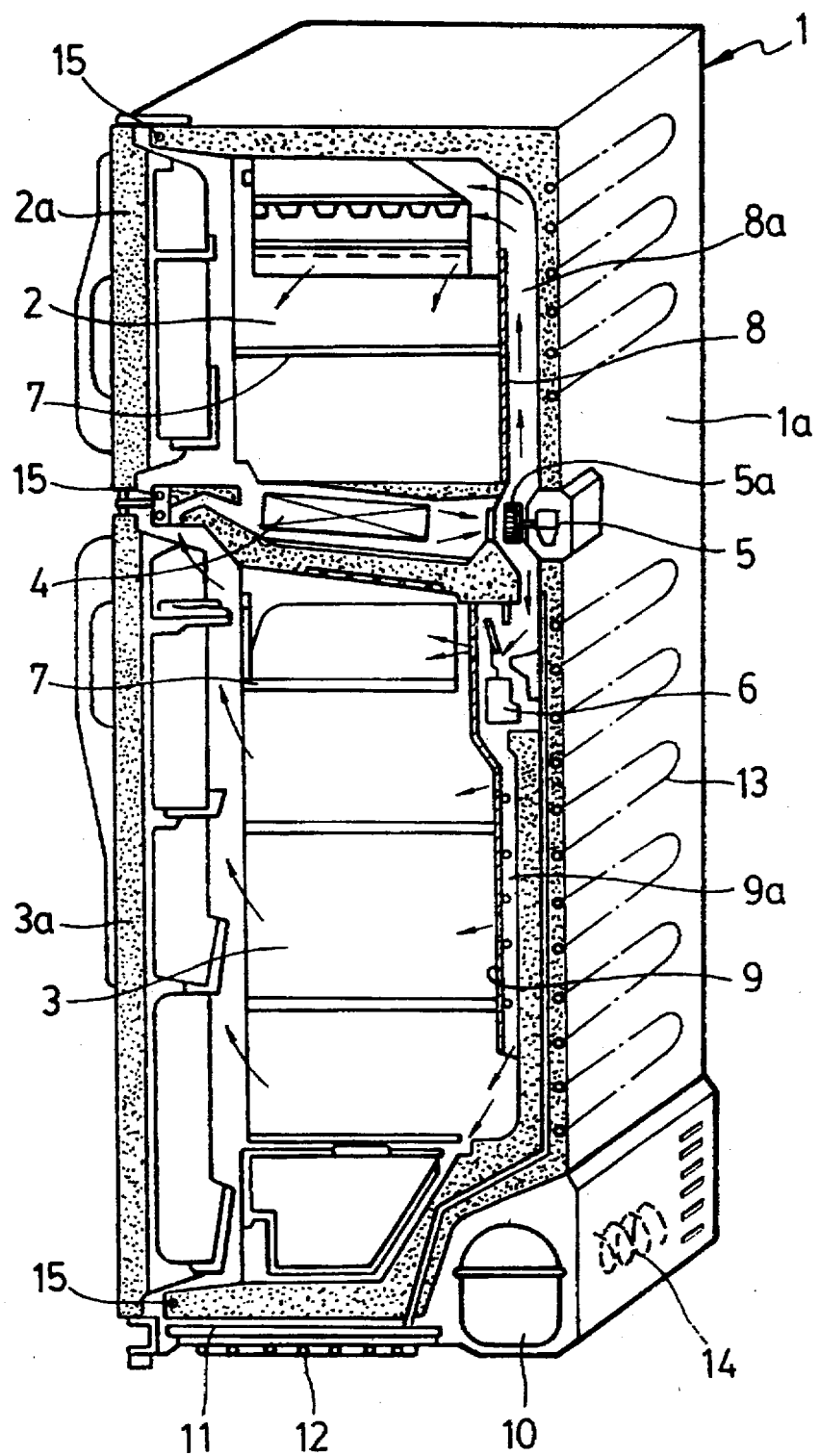
FIG. 1 is a perspective view roughly showing a structure of a common refrigerator.
Figure 2:
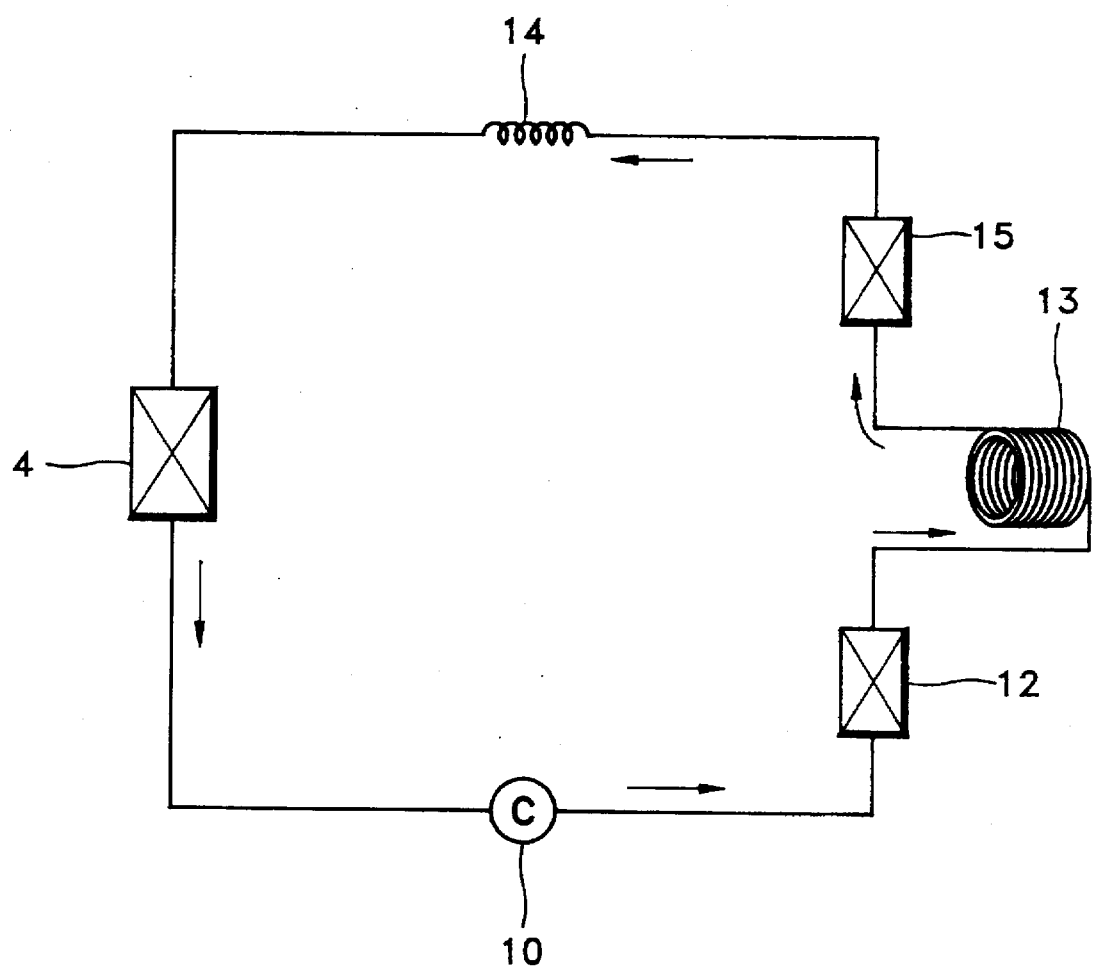
FIG. 2 is a cold air flow diagram for the common refrigerator.
Figure 3:
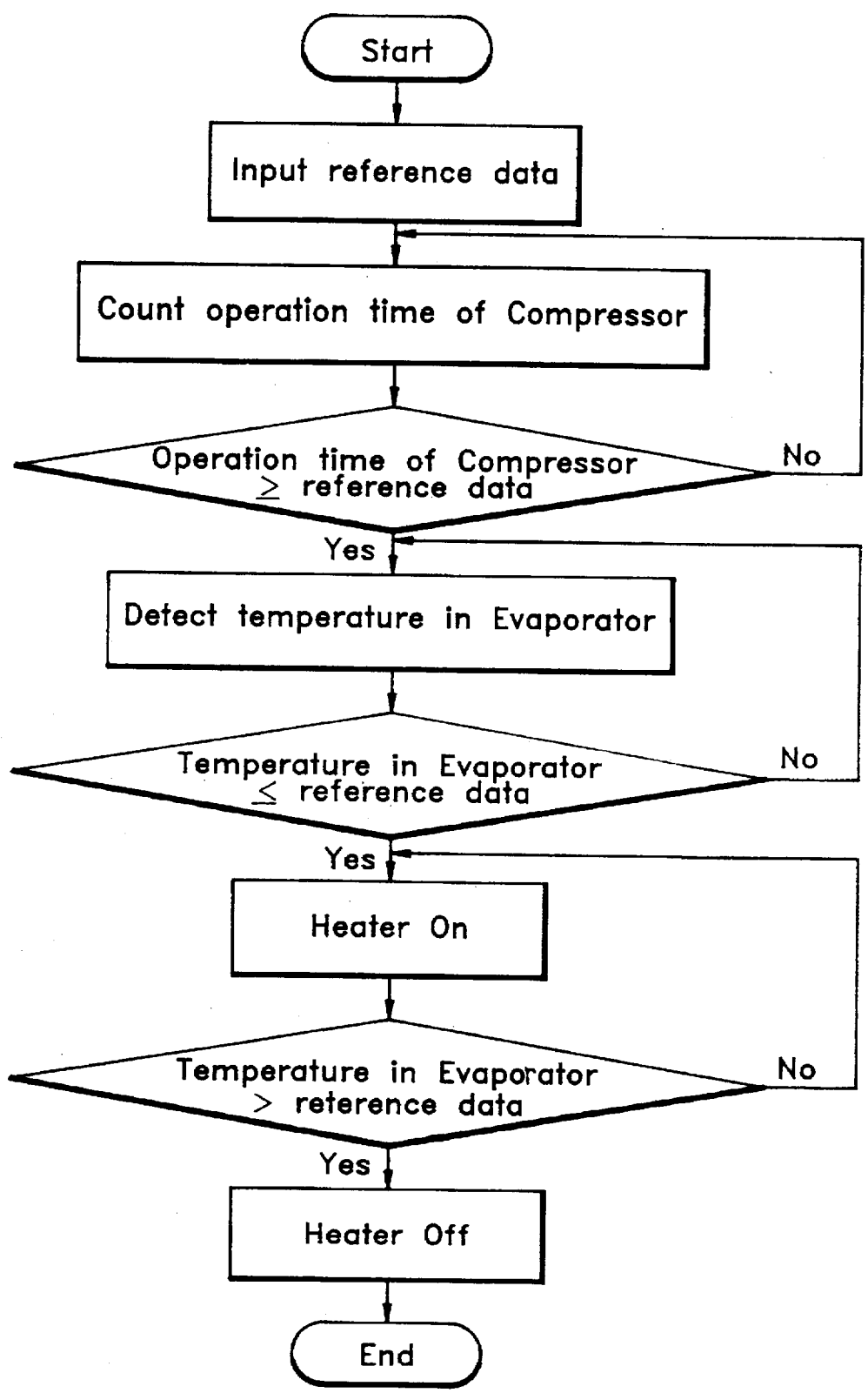
FIG. 3 is a flow chart showing a conventional defrosting method of a refrigerator.
Figure 4:
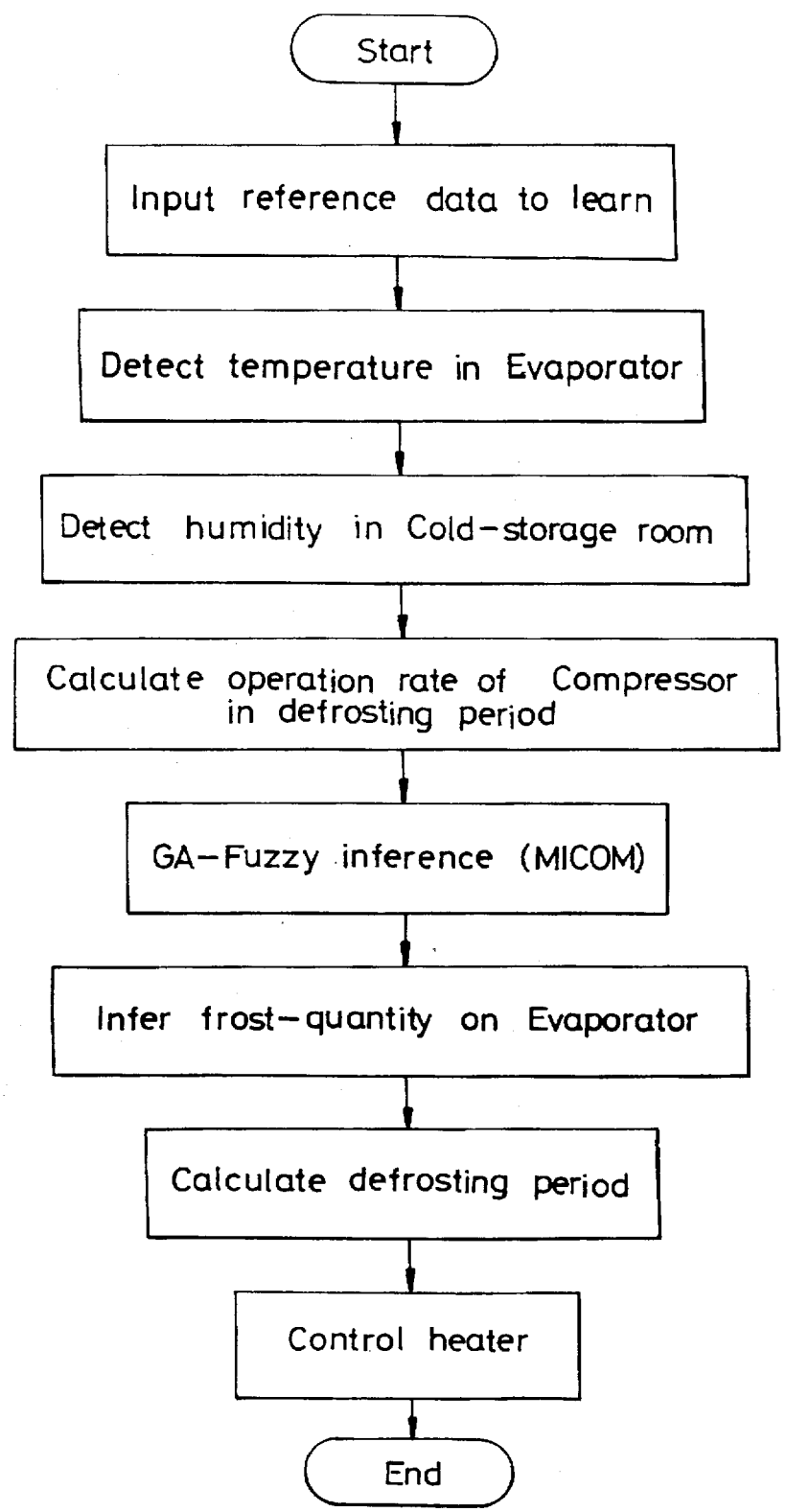
FIG. 4 is a flow chart showing a defrosting method of a refrigerator according to one embodiment of the present invention.

FIG. 4 is a flowchart showing a defrosting method for a freezer-refrigerator according to one embodiment of the present invention.

In the first step, the user inputs reference learning data of temperature in evaporator, humidity in cold-storage room, and operation rate of compressor to environmental conditions on the evaporators of the cold-storage room by experiment to a microcomputer. Next, an input device detects temperature in the evaporator and inputs the data of temperature to the microcomputer. Also, the input device detects humidity in the cold-storage room and inputs the data of humidity to the microcomputer. On the one hand, the microcomputer calculates operation rate of the compressor in defrosting period. After that, the microcomputer infers frost-quantity on the evaporator by using the GA-fuzzy theory. Then, the microcomputer calculates the defrosting period. Finally, a control device controls the defrosting heater by the calculated defrosting period.

Figure 5:
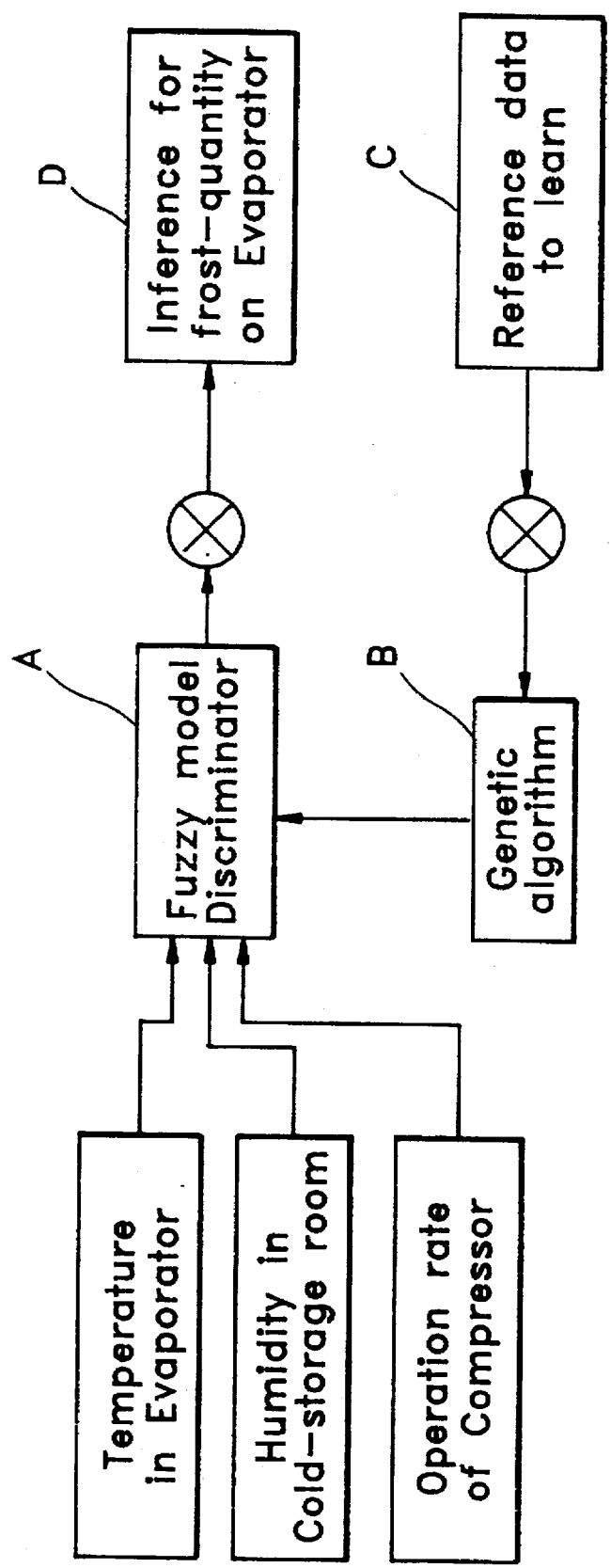
FIG. 5 is a block diagram showing a process for applying the GA-fuzzy theory to one embodiment of the present invention by the flow chart as shown in FIG. 4.

FIG. 5 is a block diagram showing a process for applying the GA-fuzzy inference to one embodiment of the present invention according to the flow chart as shown in FIG. 4. The process for applying the GA-fuzzy theory in FIG. 5 is carried out by being programmed to the microcomputer. The GA-fuzzy algorithm (B) of the present invention can be represented as conditional functions comprising premise parts and conclusion parts. The fuzzy model, i.e., temperature in evaporator, humidity in cold-storage room, and operation rate of compressor, vary depending on the minute variations of the input data. Thus, the fuzzy model discriminator (A), FIG. 5, is a fuzzy membership function that acquires optimal data of three input variables.

The GA (B) is an algorithm running conditional functions. The premise parts are conditions of said three input variables. The conclusion parts are relative formulas between optimum frost-quantity and each of said input variables. The premise parts can be set by many experiments. The reference learning data (C) is inputted to GA (B) and forms the premise parts. After running the GA (A), optimal frost-quantity can be inferred (D) continuously.

The fuzzy rules can be represented as a conditional function as follows:

If $x_1$ is $A_{1i}$, $x_2$ is $A_{2i}$, ... $x_m$ is $A_{mi}$, premise
then $y_i = a_{oi} + a_{1i}x_1 + \ldots + a_{mi}x$. conclusion
Here, $x_1$ through $x_m$ are input variables, $A_{1i}$ through $A_{mi}$ are condition parameters of the ith premise, $y_i$ is ith objective function, and $a_{oi}$ through $a_{mi}$ are parameters of the ith conclusion.

This conditional function becomes the ith fuzzy rule used in GA (B) in FIG. 5.

Generally, in order to set a fuzzy model, a setting of the structure and parameters of the premise and a setting of the structure and parameters of the conclusion are performed. In this conditional function, $x_1$ through $x_m$ correspond to the structure of the premise and the conclusion. The condition parameter $A_{1i}$ through $A_{mi}$ of the premise are set by performing many experiments and using a genetic algorithm. Thus, the data of condition parameters $A_{1i}$ through $A_{mi}$ of the premise are set by inputting the reference learning data (C) by experiment. The fuzzy model discriminator (A) determines the optimal data of input variables $x_1$ through $x_m$. And then, GA (E) infers the objective function $y_i$ of the conclusion by using a mixed inference method and determines frost-quantity continuously.

Figure 6:
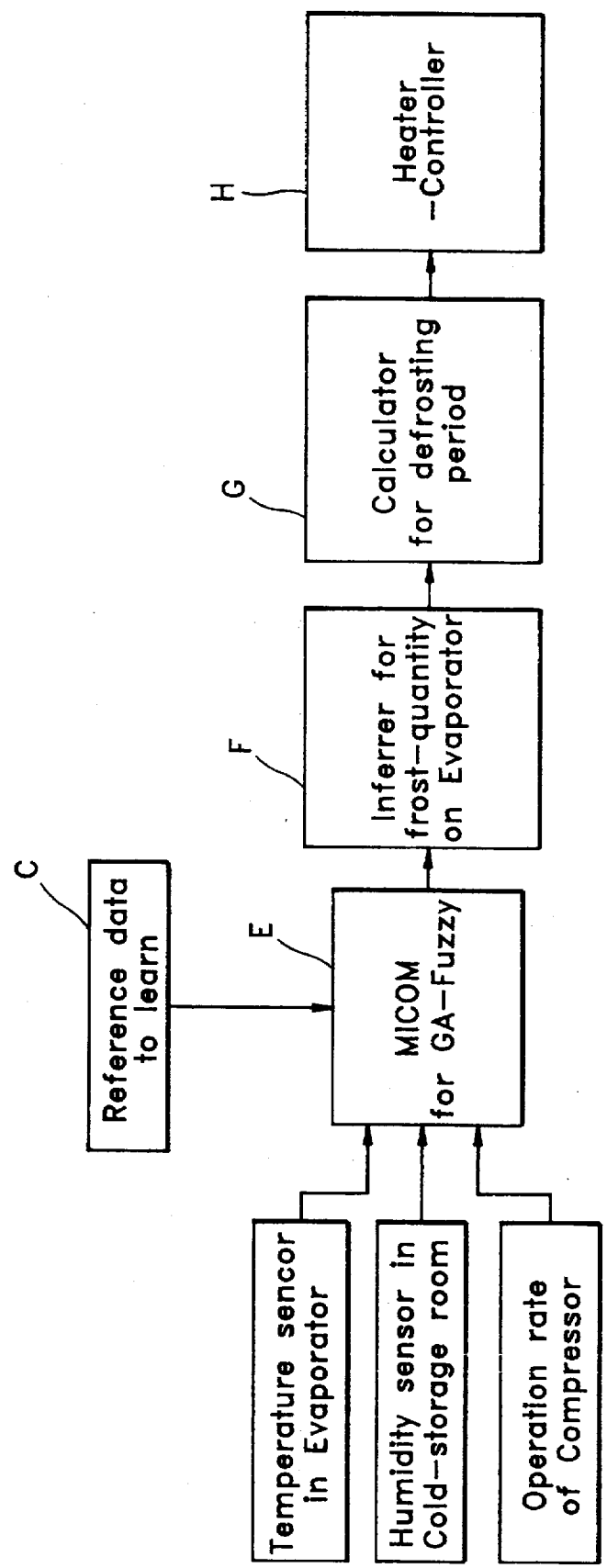
FIG. 6 is a control block diagram for realizing a defrosting apparatus for a refrigerator according to one embodiment of the present invention.

FIG. 6 is a control block diagram for realizing a defrosting apparatus for a refrigerator according to one embodiment of the present invention. If the microcomputer is programmed by using the algorithm as described above, the defrosting apparatus of a refrigerator using Ga-fuzzy theory is realized as shown in FIG. 6. The defrosting apparatus comprises: means for inputting actual environment data of temperature in evaporator, humidity in cold-storage room, and operation rate of compressor; a microcomputer (E) for inferring frost-quantity on the evaporator from a reference data to learn (C) and the actual environment data (F) and calculating defrosting period from the frost-quantity inferred (G); and a heater controller (H) for controlling a defrosting heater depending on calculated defrosting period.

Figure 7:
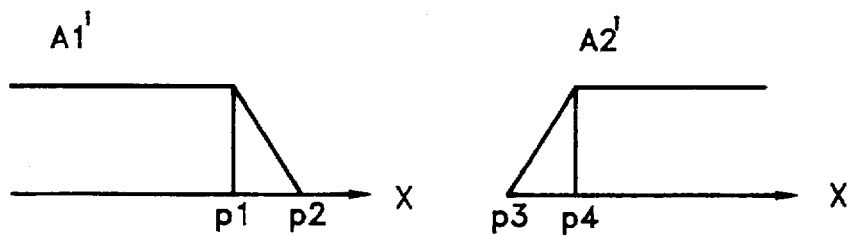
FIG. 7 is an example for calculating parameters of a premise by using a genetic algorithm (GA)

There is described a method for obtaining said condition $A_{11}$ and $A_{31}$ of the premise using the GA in FIG. 7, where x is data of each input variable set in fuzzy model discriminator (A in FIG. 5) and $p_1$ through $p_m$ each are constants for each input variable (x) based on reference learning data (C in FIG. 5) by many experiments. That is, when ith input data x satisfies the right side of the equation described in the lower part of FIG. 7, the premise of said conditional function is set. The reference learning data (C in FIG. 5) means the resultant data corresponds to the number of cases according to a data combination of the input variables by experiment. In the case of the embodiment of the present invention, the reference learning data (C in FIG. 5) is relative temperature in the evaporator, relative humidity in the cold-storage room, and relative operation rate of the experiment. And said condition parameters of the premise are two parameters of $A_{11}$ and $A_{21}$.

Figure 8:
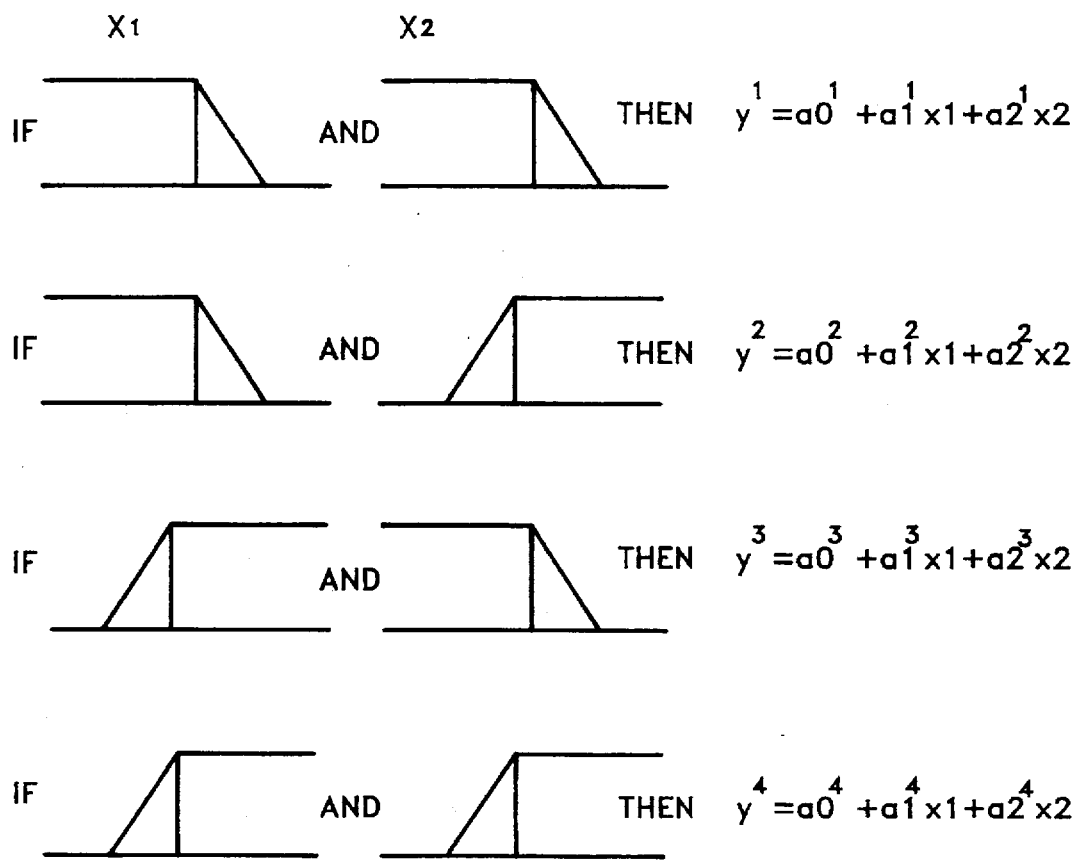
FIG. 8 is an example of a fuzzy inference method for inferring an objective function.

When the condition parameters $A_{11}$ and $A_{21}$ of the premise are set, GA (B in FIG. 5) infers the ith objective function $y_i$ by the algorithm as shown in FIG. 8 according to the mixed fuzzy inference method (TSK method). FIG. 8 is a diagram representing the case having two input variables $x_1$ and $x_2$, i.e., temperature in the humidity in the cold-storage room from the fuzzy model discriminator (A in FIG. 5). The fuzzy rule therefor is represented as follows:

| If | $x_1$ is $A_{11}$, $x_2$ is $A_{11}$, | premise |
|---|---|---|
| then | $y_1 = a_{01} + a_{11}x_1 + a_{21}x_2$. | conclusion, |
| If | $x_1$ is $A_{11}$, $x_2$ is $A_{21}$, | premise |
| then | $y_2 = a_{02} + a_{12}x_1 + a_{22}x_2$. | conclusion, |
| if | $x_1$ is $A_{21}$, $x_2$ is $A_{11}$, | premise |
| then | $y_3 = a_{03} + a_{13}x_1 + a_{23}x_2$. | conclusion, and |
| If | $x_1$ is $A_{21}$, $x_2$ is $A_{21}$, | premise |
| then | $y_4 = a_{04} + a_{14}x_1 + a_{24}x_2$. | conclusion. |

Here, $x_1$ is input variable of temperature in the evaporator, $x_2$ is input variable of humidity in the cold-storage room, $A_{11}$ and $A_{21}$ are condition parameters of the premise by experiment, and $a_{01}$ through $a_{24}$ are parameters of the conclusions by experiment.

In FIG. 5, the fuzzy model discriminator (A) determines two types of input variables $x_1$ and $x_2$. GA (B) obtains the parameters $A_{11}$ and $A_{21}$ of the premise by the method described above, and obtains parameters $a_{01}$ through $a_{24}$ of the conclusion from the obtained $A_{11}$ and $A_{21}$, to thereby infer the objective function (i.e., frost-quantity on the evaporator).

According to the present invention, a refrigerator can be defrosted by calculating each defrosting period with precision and accuracy even at an input function which has many inflection points and is impossible to differentiate, which is different from the conventional defrosting method using the crisp's logical algorithm consisting of '0' and '1'.

What is claimed is:

1. A defrosting method of a refrigerator using genetic algorithm (GA)-fuzzy theory comprising the steps of:

acquiring experimentally predetermined redetermined reference learning data of temperature of an evaporator, humidity in a cold-storage room, and operation rate of a compressor during said defrosting period;

storing said acquired reference learning data to a microcomputer;

measuring the actual environment data of temperature of an evaporator, humidity in a cold-storage room, and operation rate of a compressor during said defrosting period;

inputting said actual environment data to said microcomputer;

inferring a frost-quantity on the evaporator from said acquired reference learning data and said inputted actual environment data by said microcomputer by using the GA-fuzzy theory;

calculating a defrosting period from the inferred frost-quantity; and controlling a defrosting heater depending on said calculated defrosting period.

2. A defrosting method of a refrigerator using GA-fuzzy theory as claimed in claim 1, wherein a mixed inference method (TSK method) is applied to said GA-fuzzy theory as a fuzzy inference method.

3. A defrosting method of a refrigerator using GA-fuzzy theory as claimed in claim 2, wherein a genetic algorithm is applied for setting parameters of a premise of said TSK method.

4. A defrosting apparatus of a refrigerator using a GA-fuzzy theory comprising:

means for inputting actual environment data of temperature of an evaporator, humidity in a cold-storage room, and operation rate of a compressor during said defrosting period;

means for inferring an amount of frost on an evaporator from a reference learning data and said inputted actual environment data by using the GA-fuzzy theory;

means for calculating a defrosting period form the frost amount on the evaporator; and means for controlling a defrosting heater depending on said defrosting period.

5. A defrosting apparatus of a refrigerator using GA-fuzzy theory as claimed in claim 4, wherein a mixed inference method (TSK method) is applied to said GA-fuzzy theory as a fuzzy inference method.

6. A defrosting apparatus of a refrigerator using GA-fuzzy theory as claimed in claim 5, wherein a genetic algorithm is applied for setting parameters of a premise of said TSK method.

* * * * *